United States Patent
Takata et al.

(10) Patent No.: US 10,897,050 B2
(45) Date of Patent: Jan. 19, 2021

(54) FUEL CELL SEPARATOR AND FUEL CELL DEVICE

(71) Applicants: Satoshi Takata, Toyota (JP); Masayuki Itagaki, Tokyo (JP)

(72) Inventors: Satoshi Takata, Toyota (JP); Masayuki Itagaki, Tokyo (JP)

(73) Assignees: TOYOTA JIDOSHA KABUSHIKI KAISHA, Toyota (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 0 days.

(21) Appl. No.: 16/444,015

(22) Filed: Jun. 18, 2019

(65) Prior Publication Data
US 2020/0006787 A1    Jan. 2, 2020

(30) Foreign Application Priority Data
Jun. 28, 2018 (JP) .................. 2018-122604

(51) Int. Cl.
| | | |
|---|---|---|
| H01M 8/00 | (2016.01) |
| H01M 8/0228 | (2016.01) |
| H01M 8/1039 | (2016.01) |
| H01M 8/0215 | (2016.01) |
| H01M 8/021 | (2016.01) |
| H01M 8/1018 | (2016.01) |

(52) U.S. Cl.
CPC ......... *H01M 8/0228* (2013.01); *H01M 8/021* (2013.01); *H01M 8/0215* (2013.01); *H01M 8/1039* (2013.01); H01M 2008/1095 (2013.01); H01M 2300/0082 (2013.01)

(58) Field of Classification Search
CPC ......... H01M 8/021; H01M 2008/1095; H01M 8/1039; H01M 8/0228; H01M 2300/0082
See application file for complete search history.

(56) References Cited

U.S. PATENT DOCUMENTS 5,348,634 A * 9/1994 Matsuo .................. C25D 13/20
204/486

FOREIGN PATENT DOCUMENTS

| JP | H08-185870 A | 7/1996 |
| JP | 2966595 B2 | 10/1999 |
| JP | 2011-029196 A | 2/2011 |

* cited by examiner

*Primary Examiner* — Cynthia H Kelly
*Assistant Examiner* — Monique M Wills
(74) *Attorney, Agent, or Firm* — Dickinson Wright PLLC

(57) ABSTRACT

An object of the present disclosure is to provide a fuel cell separator having a low contact resistance due to a tin oxide film and having an excellent corrosion resistance. An embodiment is a method for manufacturing a fuel cell separator including a stainless steel substrate. The method includes forming the tin oxide film on a surface of the stainless steel substrate; and attaching phosphoric acid or phosphate to at least a defective portion in the tin oxide film.

9 Claims, 7 Drawing Sheets

FUEL CELL SEPARATOR AND FUEL CELL DEVICE

CROSS REFERENCE TO RELATED APPLICATIONS

The present application claims priority from Japanese patent application JP 2018-122604 filed on Jun. 28, 2018, the content of which is hereby incorporated by reference into this application.

BACKGROUND

Technical Field

The present disclosure relates to a fuel cell separator and a fuel cell device using the same.

Background Art

A fuel cell of a solid polymer fuel cell device includes a Membrane Electrode Assembly (MEA), which includes an ion permeable electrolyte membrane, an anode side catalyst layer (electrode layer), and a cathode side catalyst layer (electrode layer). The electrolyte membrane is sandwiched between the anode side catalyst layer and the cathode side catalyst layer. The Membrane Electrode Assembly has both sides on which Gas Diffusion Layers (GDLs) are formed to provide fuel gas or oxidant gas and collect electricity generated through an electrochemical reaction. The Membrane Electrode Assembly having both sides on which the GDLs are disposed is referred to as a Membrane Electrode & Gas Diffusion Layer Assembly (MEGA), and the MEGA is sandwiched by a pair of separators. Here, the MEGA serves as a power generation unit of the fuel cell device, and when the gas diffusion layer is not disposed, the Membrane Electrode Assembly serves as the power generation unit of the fuel cell device.

For example, JP H08-185870 A proposes the following separator as such fuel cell separator. This separator includes: a substrate body formed of a cermet made from refractory metal containing chrome and ceramic, and a protective film of metal oxide, which is coated such that a surface of the substrate body opposed to cathode gas does not contact the cathode gas. JP 08-185870 A further exemplifies tin oxide as one example of this metal oxide.

SUMMARY

With the fuel cell separator according to JP H08-185870 A, it is presumed that a reduction in diffusion of the chrome into a cathode with the protective film of the metal oxide ensures reducing deterioration of a power generation performance of a fuel cell device. Additionally, since the tin oxide has a comparatively high conductive property, the tin oxide is presumed to ensure lowering a contact resistance. However, formation of a film of the tin oxide on a substrate as the protective film of the metal oxide possibly generates a defective portion (such as a recessed portion where the tin oxide film is not formed) in the tin oxide film. The defective portion in the tin oxide film has a possibility of causing corrosion under a corrosion environment due to an exposure of a stainless steel substrate and the like. Especially, fluoride ion derived from a solid electrolyte membrane (for example, perfluorosulfonic acid based polymer) or the like in contact with the defective portion forms a complex with metal, such as Fe contained in the stainless steel substrate, thus dissolving the metal in the substrate. The dissolution of the metal such as Fe causes pitting corrosion. Additionally, oxide (insulating property) from the dissolved metal attaches to a surface of the tin oxide film, resulting in deterioration in a conductive property of the separator. Furthermore, the dissolution of the metal, such as Fe generates hydrogen peroxide with metal ions, such as Fe ions serving as a catalyst (Fenton reaction), possibly causing a disintegration of the solid electrolyte membrane. The disintegration of the solid electrolyte membrane obviously deteriorates the power generation performance of the fuel cell device.

Therefore, the present disclosure provides a fuel cell separator having a low contact resistance due to a tin oxide film and having an excellent corrosion resistance.

Aspects of the embodiment are as follows.

(1) A method for manufacturing a fuel cell separator including a stainless steel substrate includes: forming a tin oxide film on a surface of the stainless steel substrate; and attaching phosphoric acid or phosphate to at least a defective portion in the tin oxide film.

(2) In the method for manufacturing a fuel cell separator according to (1), the phosphate is inorganic phosphate.

(3) In the method for manufacturing a fuel cell separator according to (2), the inorganic phosphate is orthophosphate.

(4) In the method for manufacturing a fuel cell separator according to any one of (1) to (3), the attaching includes: brining the stainless steel substrate on which the tin oxide film is formed into contact with a solution containing the phosphoric acid or the phosphate; and drying the stainless steel substrate after the contact.

(5) The method for manufacturing a fuel cell separator according to any one of (1) to (4) further includes removing a passive film present on the surface of the stainless steel substrate under a vacuum condition prior to the forming. The forming includes forming the tin oxide film with the vacuum condition maintained.

(6) A fuel cell separator that includes a stainless steel substrate and a tin oxide film. The tin oxide film is formed on a surface of the stainless steel substrate. Phosphoric acid or phosphate attaches to a defective portion in the tin oxide film.

(7) A fuel cell device includes the fuel cell separators according to (6).

(8) The fuel cell device according to (7) further includes a solid electrolyte membrane.

(9) In the fuel cell device according to (8), the solid electrolyte membrane contains fluorine-based electrolyte resin.

The present disclosure allows providing a fuel cell separator having a low contact resistance due to a tins oxide film and having an excellent corrosion resistance.

DETAILED DESCRIPTION

Figure 1A:
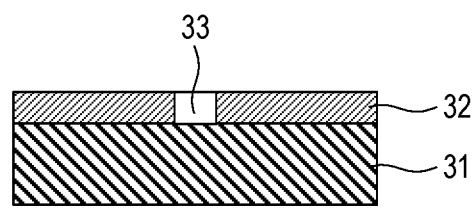
FIG. 1A is a schematic cross-sectional view describing a flow diagram of generating corrosion in a defective portion on a tin oxide film.
Figure 1B:
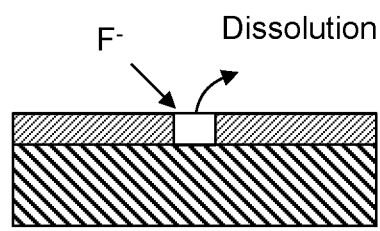
FIG. 1B is a schematic cross-sectional view describing the flow diagram of generating the corrosion in the defective portion on the tin oxide film continuous from FIG. 1A.
Figure 1C:
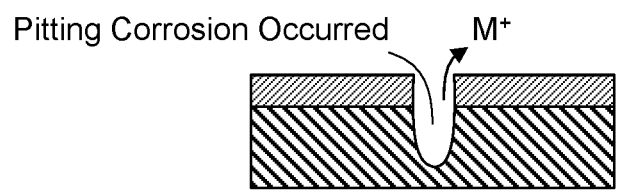
FIG. 1C is a schematic cross-sectional view describing the flow diagram of generating the corrosion in the defective portion on the tin oxide film continuous from FIG. 1B.

Formation of a film of tin oxide on a substrate possibly generates a defective portion in the tin oxide film. The defective portion includes, for example, a recessed portion where the tin oxide film is not formed or a recessed portion with an insufficient film thickness in terms of protection. There may be a case where many defective portions occur depending on materials and conditions employed for the formation of the tin oxide film. The defective portion in the tin oxide film has a possibility of causing corrosion under a corrosion environment due to an exposure of a stainless steel substrate and the like. The following describes this occurrence of corrosion with reference to FIG. 1A to FIG. 1C. In FIG. 1A, a defective portion 33 occurs in a part of a tin oxide film 32 formed on a stainless steel substrate 31. Next, as illustrated in FIG. 1B, fluoride ion derived from a solid electrolyte membrane (for example, perfluorosulfonic acid based polymer) or the like in contact with the defective portion forms a complex with metal, such as Fe contained in the stainless steel substrate, thus dissolving the metal in the substrate. As illustrated in FIG. 1C, the dissolution of the metal such as Fe causes pitting corrosion. Additionally, oxide (insulating property) of the dissolved metal attaches to a surface of the tin oxide film, resulting in deterioration in a conductive property of the separator. Furthermore, the dissolution of the metal, such as Fe generates hydrogen peroxide with metal ions such as Fe ions serving as a catalyst (Fenton reaction), possibly causing a disintegration of the solid electrolyte membrane. The disintegration of the solid electrolyte membrane obviously deteriorates the power generation performance of the fuel cell device.

Therefore, the embodiment provides a method for manufacturing fuel cell separator including a stainless steel substrate that includes a forming step of forming a tin oxide film on a surface of the stainless steel substrate and an attaching step of attaching phosphoric acid or phosphate to at least a defective portion in the tin oxide film.

Figure 2A:
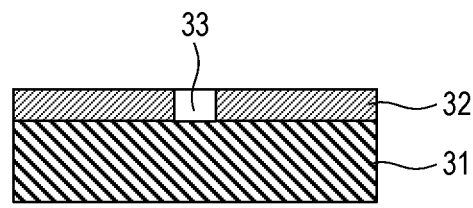
FIG. 2A is a schematic cross-sectional view describing a reason why a corrosion resistance of a separator is improved by a manufacturing method according to an embodiment.
Figure 2B:
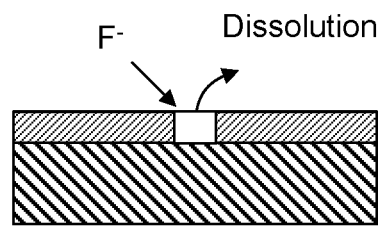
FIG. 2B is a schematic cross-sectional view describing the reason why the corrosion resistance of the separator is improved by the manufacturing method according to the embodiment continuous from FIG. 2A.
Figure 2C:
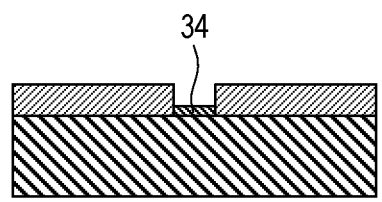
FIG. 2C is a schematic cross-sectional view describing the reason why the corrosion resistance of the separator is improved by the manufacturing method according to the embodiment continuous from FIG. 2B.

In the embodiment, first, after the tin oxide film is formed on the surface of the stainless steel substrate, the phosphoric acid or the phosphate is attached to at least the defective portion in the tin oxide film. Attaching the phosphoric acid or the phosphate to the defective portion in the tin oxide film allows improvement in corrosion resistance. The following describes a reason why the corrosion resistance is improved by the attachment of the phosphoric acid or the phosphate with reference to FIG. 2A to FIG. 2C. In FIG. 2A, the defective portion 33 occurs in a part of the tin oxide film 32 formed on the stainless steel substrate 31. Next, as illustrated in FIG. 2B, the fluoride ion in contact with the defective portion forms a complex ($[Fe^{2+}(F^-)_6]^{4-}$) with the metal, such as Fe contained in the stainless steel substrate 31. The complex reacts with the phosphoric acid or the phosphate (for example, trisodium phosphate) attached to the substrate surface and forms a film 34 (for example, $Fe(PO_4)$) of iron phosphate or the like. Consequently, the protective film 34 is formed at least on the defective portion, thus improving the corrosion resistance. Note that the above-described theory is based on a presumption and therefore the presumption do not limit the embodiment. While FIG. 2C illustrates a configuration where the protective film 34 is formed in the defective portion 33 on the stainless steel substrate 31, the protective film 34 may be formed on the tin oxide film 32.

In this description, the attachment of the phosphoric acid or the phosphate means presence of the phosphoric acid or the phosphate on the surface of the substrate or the tin oxide film in any given form including the case where the phosphoric acid or the phosphate itself physically adsorbs onto the surface of the substrate or the tin oxide film and the case where the phosphoric acid or the phosphate attaches to the surface in the form of dissociated ions. The phosphoric acid or the phosphate or their ions may form a chemical bond with a functional group present on the surface of the substrate or the tin oxide film.

The following describes the embodiment in detail.

[Forming Step]

The method for manufacturing fuel cell separator according to the embodiment includes the forming step of forming the tin oxide film on the surface of the stainless steel substrate.

In the embodiment, the tin oxide film only needs to be disposed on at least a part of the surface of the stainless steel substrate. Meanwhile, since the corrosion resistance is required especially in portions contacting a gas diffusion layer and the separator, the tin oxide film is formed on at least the part of the surface of the stainless steel substrate in contact with the gas diffusion layer in some embodiments.

A method for forming the tin oxide film on the stainless steel substrate is not especially limited. For example, the film can be formed by a physical vapor deposition method (PVD) using, for example, sputtering, vacuum deposition, ionized deposition, or ion plating. For example, the tin oxide film can be formed on the surface of the stainless steel substrate by sputtering using plasma and the like targeting a sintered body obtained through sintering a raw material containing tin oxide particles. In the embodiment, there may be a case where the defective portion occurs depending on materials and conditions employed to form the tin oxide film. For example, a large amount of impurities contained in the material is likely to generate the defective portion.

To form the tin oxide film by sputtering, the sputtering can be performed under an oxygen gas atmosphere, under an inert gas atmosphere, or under a vacuum atmosphere (under a depressurized atmosphere) at the formation of the tin oxide film. Especially, the tin oxide film is formed under the inert gas atmosphere or under the vacuum atmosphere (under the depressurized atmosphere) in some embodiments.

The tin oxide film has a film thickness in a range of 10 to 300 nm in some embodiments. The tin oxide film having the film thickness of 10 nm or more can effectively develop the effect brought by the tin oxide film. The tin oxide film having the film thickness of 300 nm or less can lower an internal stress of the tin oxide film and can effectively reduce peeling-off of the tin oxide film from the stainless steel substrate.

The tin oxide film contains antimony (Sb) in some embodiments. Containing the antimony allows the tin oxide film to turn into a semiconductor. Specifically, the tin oxide film is tin oxide containing the antimony in a concentration of 0.2 to 10 atomic % in some embodiments. In such tin oxide film, pentavalent antimony is substituted for tetravalent tin at sites of the tetravalent tin in a crystal lattice of the tin oxide. This increases a carrier concentration inside the tin oxide film and improves the conductive property (conductivity) of the tin oxide film. Accordingly, the contact resistance of the separator in which the tin oxide film is formed can be lowered, and as the result, an internal resistance of the fuel cell stack can be lowered. Content of the antimony of 0.2 atomic % or more allows sufficiently increasing the carrier concentration brought by the substitution with the antimony; therefore, the conductive property of the tin oxide film can be effectively improved. The content of the antimony of 10 atomic % or less allows reducing an inhibition of movements of carriers due to an excessive amount of antimony. The tin oxide film is the tin oxide containing the antimony in a concentration of 0.5 to 10 atomic % in some embodiments.

With the measurement of the tin oxide containing the antimony in a concentration of 0.2 to 10 atomic % by an X-ray diffraction method using a CuKα ray, a diffraction peak of a (110) plane of tetragonal tin oxide is detected at near a Bragg angle 2θ=26.6° (specifically, in a range of 26.6°±0.5°). In some embodiment, with the X-ray diffraction measurement using the CuKα ray, a half width W of the diffraction peak of the (110) plane of the tin oxide in the tin oxide film near 2θ=26.6° may be 1° or less. The half width W is a width of the diffraction peak at a value half of the maximum value P (P/2) of diffraction intensity of the diffraction peak. In the embodiment, meeting the condition that the half width of the diffraction peak is 1° or less increases a crystalline nature of the tin oxide constituting the tin oxide film and therefore the conductive property of the tin oxide film can be enhanced. Consequently, the contact resistance of the separator can be further lowered. The half width of the diffraction peak of the (110) plane of the tin oxide of 0.5° or less allows further lowering the contact resistance of the separator.

Furthermore, the tin oxide film contains oxygen-deficient tin oxide in some embodiments and contains oxygen-deficient tin oxide expressed by $SnO_{2-x}$ ($0.1 \leq X \leq 0.4$) in some embodiment. The oxygen-deficient tin oxide increases the carrier concentration inside the tin oxide film; therefore, the conductive property of the tin oxide film is improved. As the result, the contact resistance of the separator lowers, thereby ensuring lowering the internal resistance of the fuel cell stack. Note that the oxygen-deficient tin oxide means tin oxide in which oxygen is partially absent from a tetragonal crystalline structure of $SnO_2$.

The oxygen-deficient tin oxide meeting the above-described range of X can be obtained, for example, through an adjustment of a partial pressure of oxygen gas at the film formation and/or an applied voltage at the sputtering.

The tin oxide film may contain at least one other metal in addition to the tin. The other metal includes, for example, bismuth or tellurium. Content of the other metal can be appropriately adjusted taking the conductive property, the corrosion resistance, and similar specification into consideration.

A metallic element concentration in the stainless steel substrate can be measured by composition analysis using, for example, an X-ray Photoelectron Spectroscopy (XPS) apparatus.

Prior to the forming step, a removing step of removing a passive film present on the surface of the stainless steel substrate under a vacuum condition is included in some embodiments. Furthermore, the forming step forms the tin oxide film with the vacuum condition in the removing step maintained in some embodiments. The formation of the tin oxide film with the passive film present on the surface of the stainless steel substrate removed allows further effectively improving the conductive property.

[Attaching Process]

The embodiment includes the attaching step of attaching the phosphoric acid or the phosphate to at least the defective portion in the tin oxide film after the forming step.

The attachment of the phosphoric acid or the phosphate to the defective portion is not especially limited and can be performed by a general method. For example, the stainless steel substrate on which the tin oxide film is formed is brought into contact with a solution (water solution) containing the phosphoric acid or the phosphate, and then the stainless steel substrate is dried, thus performing the attachment. More specifically, the method includes a method that immerses the stainless steel substrate on which the tin oxide film is formed into the solution containing the phosphoric acid or the phosphate, a method that sprays the solution containing the phosphoric acid or the phosphate to the stainless steel substrate on which the tin oxide film is formed, and similar method. The phosphoric acid or the phosphate in the solution has the concentration of 0.005 to 0.2 M in some embodiments and 0.01 to 0.1 M in some embodiments. The concentration of 0.005 M or more increases an amount of attached phosphoric acid or phosphate, thereby ensuring effectively improving the corrosion resistance. The concentration of 0.2 M or less avoids an excessively high pH of the solution and allows reducing dissolution of the tin oxide. A contact period with the solution can be appropriately adjusted taking, for example, the concentration of the phosphoric acid or the phosphate into consideration. Although a solvent is not especially limited, for example, water is usable. The pH of the solution is not especially limited and is, for example, 3 to 9.

The phosphate is inorganic phosphate in some embodiments. Specific examples of the inorganic phosphate include, trisodium phosphate ($Na_3PO_4$), tripotassium phosphate ($K_3PO_4$), disodium hydrogenphosphate ($Na_2HPO_4$), sodium dihydrogenphosphate ($NaH_2PO_4$), dipotassium hydrogenphosphate ($K_2HPO_4$), potassium dihydrogenphosphate ($KH_2PO_4$), and the like. These inorganic salts may have a hydrate structure. One kind of the phosphate may be used alone, or a plurality of kinds of the phosphates may be used in combination. The phosphoric acid and the phosphate may be used in combination.

After the forming step, the attaching step may be performed under an environment where the passive film is not formed on the defective portion in the tin oxide film. For example, after the execution of the removing step of removing the passive film present on the surface of the stainless steel substrate under the vacuum condition, the forming step of the tin oxide film is performed with the vacuum condition in the removing step maintained. The attaching step is performed under an inert gas environment without moving the stainless steel substrate on which the tin oxide film is formed to an environment where the passive film is formed. As the inert gas, for example, nitrogen and argon are usable. The solution containing the phosphoric acid or the phosphate is bubbled with the inert gas (for example, the nitrogen or the argon) to reduce dissolved oxygen in some embodiments.

The following describes a configuration of the fuel cell device according to the embodiment with reference to the drawings. The following describes the case of an application of the fuel cell separators according to the embodiment to fuel cell devices mounted to a fuel cell vehicle or the like as one example. However, the embodiment is not limited by the example.

Figure 3:
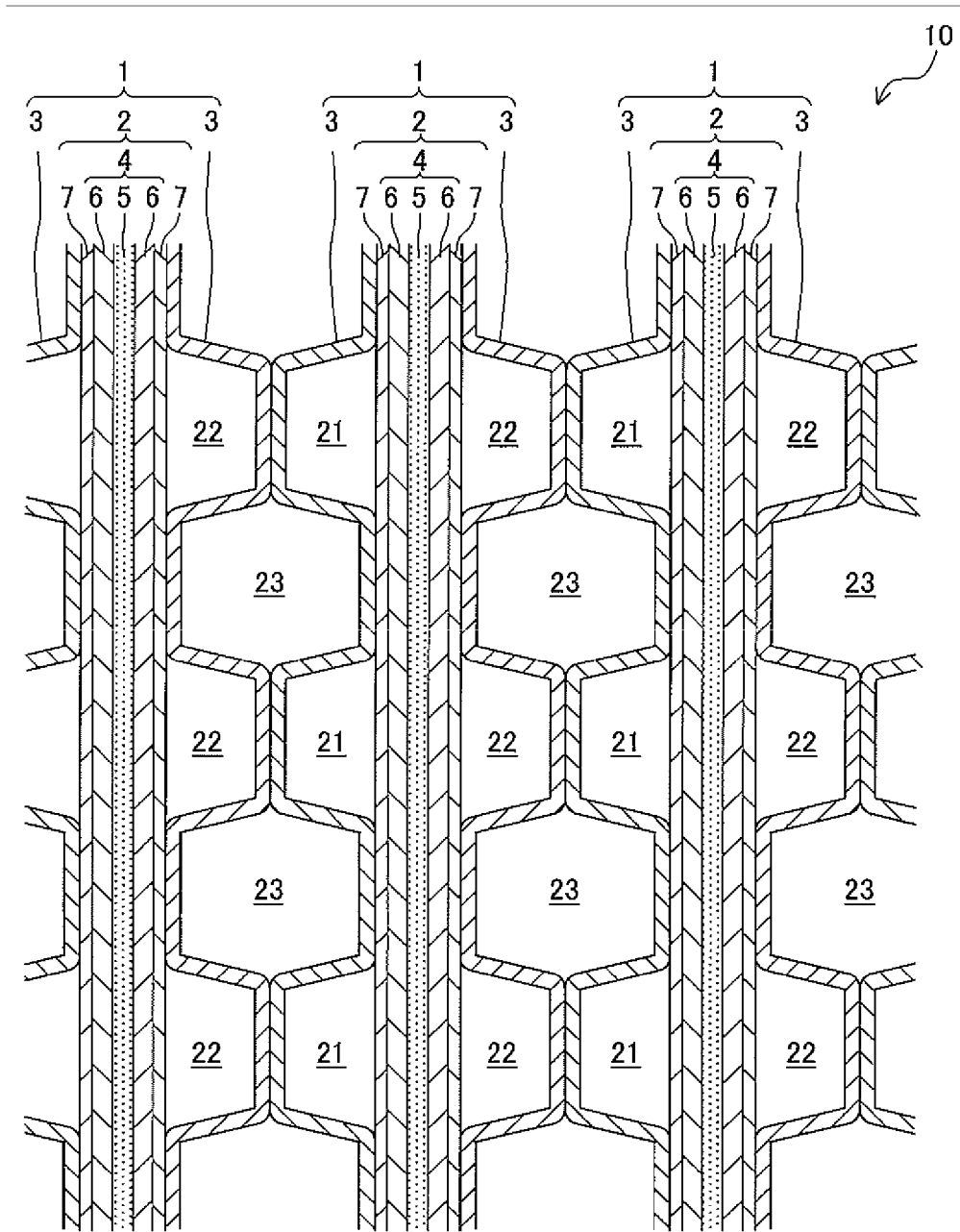
FIG. 3 is a cross-sectional view of a main part of a fuel cell stack including fuel cell separators according to the embodiment.

FIG. 3 is a cross-sectional view of a main part of a fuel cell stack (fuel cell device) 10. As illustrated in FIG. 3, in the fuel cell stack 10, a plurality of cells (single cells) 1 as a basic unit are stacked. Each of the cells 1 is a solid polymer fuel cell device that generates an electromotive force by an electrochemical reaction between oxidant gas (for example, air) and fuel gas (for example, hydrogen). The cell 1 includes a MEGA 2 and the separators (fuel cell separators) 3 that are in contact with the MEGAs 2 so as to partition the MEGAs 2. In the embodiment, the MEGA 2 is sandwiched by the pair of separators 3 and 3.

The MEGA 2 is made by integrating a Membrane Electrode Assembly (MEA) 4 and gas diffusion layers 7 and 7, which are disposed on both sides of the Membrane Electrode Assembly 4. The Membrane Electrode Assembly 4 includes an electrolyte membrane 5 and a pair of electrodes 6 and 6 bonded such that the electrolyte membrane 5 is sandwiched between the pair of electrodes 6 and 6. The electrolyte membrane 5 includes a proton-conductive ion exchange membrane formed of a solid polymer material. The electrode 6 is formed of, for example, a porous carbon material carrying a catalyst, such as platinum. The electrode 6 disposed on one side of the electrolyte membrane 5 becomes an anode and the electrode 6 on the other side becomes a cathode. The gas diffusion layer 7 is formed of a conductive member with gas permeability, which includes a carbon porous body, such as a carbon paper or a carbon cloth, or a metal porous body, such as a metal mesh or a porosity metal.

The MEGA 2 is a power generation unit of the fuel cell device 10. The separator 3 is in contact with the gas diffusion layer 7 of the MEGA 2. When the gas diffusion layer 7 is absent, the Membrane Electrode Assembly 4 serves as the power generation unit, and in this case, the separator 3 is in contact with the Membrane Electrode Assembly 4. Accordingly, the power generation unit of the fuel cell device 10 includes the Membrane Electrode Assembly 4 and is in contact with the separator 3.

The separator 3 is a plate-shaped member that uses a metal excellent in conductivity, gas impermeability, and similar specification as a substrate. The separator 3 has one surface abutting on the gas diffusion layer 7 of the MEGA 2 and the other surface abutting on another adjacent separator 3.

Each of the separators 3 is formed into a wave form. The shape of the separator 3, the wave shape, forms an isosceles trapezoid and a top portion of the wave shape is flat. This top portion has both ends forming equal angles to provide angular shapes. That is, each of the separators 3 presents an approximately identical shape whether it is viewed from a front side or a back side. The top portions of the separator 3 are in surface contact with one gas diffusion layer 7 of the MEGA 2, and the top portions of the separator 3 are in surface contact with the other gas diffusion layer 7 of the MEGA 2.

A gas flow channel 21 defined between the gas diffusion layer 7 on a side of one electrode (namely, the anode) 6 and the separator 3 is a flow passage through which a fuel gas flows. A gas flow channel 22 defined between the gas diffusion layer 7 on a side of the other electrode (that is, the cathode) 6 and the separator 3 is a flow passage through which an oxidant gas flows. When the fuel gas is supplied to the gas flow channel 21 on one side opposed to the gas flow channel 22 via the cell 1 and the oxidant gas is supplied to the gas flow channel 22, an electrochemical reaction occurs inside the cell 1 to generate an electromotive force.

Furthermore, one cell 1 and another cell 1 adjacent to the one cell 1 are disposed such that the electrode 6 as the anode and the electrode 6 as the cathode face one another. The top portions on a back surface side of the separator 3 disposed along the electrode 6 as the anode of the one cell 1 are in surface contact with the top portions on the back surface side of the separator 3 disposed along the electrode 6 as a cathode of another one cell 1. Water as a coolant to cool the cells 1 flows through a space 23 defined between the separators 3 and 3 that are in surface contact between the adjacent two cells 1.

Figure 4:
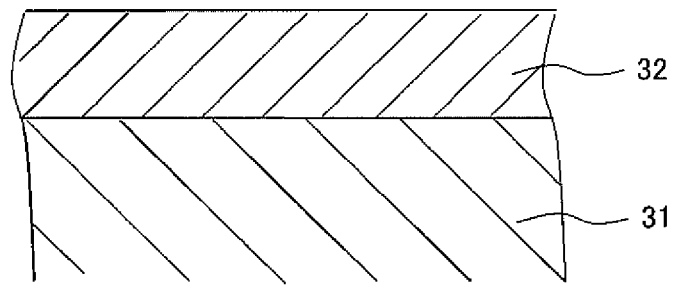
FIG. 4 is an enlarged cross-sectional view near a surface of the fuel cell separator according to the embodiment.

As illustrated in FIG. 4, the separator 3 includes the stainless steel substrate 31. A material of the stainless steel substrate includes a stainless steel. Furthermore, the tin oxide films 32 are coated on both surfaces (that is, the surface on the side in contact with the gas diffusion layer 7 and the surface on the side in contact with the adjacent separator 3) of the separator 3.

In the embodiment, the phosphoric acid or the phosphate is attached to at least the defective portion in the tin oxide film. As described above, the phosphoric acid or the phosphate attached to the defective portion in the tin oxide film allows the improvement in the corrosion resistance of the separator. For example, dissolving the phosphoric acid or the phosphate present on the separator surface with the solvent, such as the water and analyzing the obtained solution ensure confirmation for presence/absence of the phosphoric acid or the phosphate.

As described above, in the fuel cell device, the fluoride ion is likely to be generated from fluorine-based electrolyte resin, such as the perfluorosulfonic acid based polymer. Therefore, the solid electrolyte membrane containing the fluorine-based electrolyte resin employed by the fuel cell device makes the fuel cell separator of the embodiment especially effective. Examples of the fluorine-based electrolyte resin include perfluorosulfonic acid based polymer and the like and specifically, for example, Nafion (product name, manufactured by DuPont), Flemion (product name, manufactured by AGC Inc., and Aciplex (product name, manufactured by Asahi Kasei Corporation.) can be included. Among these substances, because of its excellent proton conductive property, Nafion (product name, manufactured by DuPont) is usable in some embodiments.

EXAMPLES

The following examples describe the embodiment. Note that the following examples do not limit the embodiment.

Example 1

A test piece corresponding to the separator was manufactured in accordance with a method described below. First, SUS447 plate having a thickness of 0.1 mm was prepared as the stainless steel substrate of the separator. Next, the stainless steel substrate was installed inside a vacuum container, argon gas was introduced in the vacuum containers under a vacuum condition, a voltage was applied to generate argon ions, and an oxide film on a surface of the stainless steel substrate was removed with these argon ions.

Next, tin oxide particles and antimony oxide particles were mixed and sintered to produce a sintered body as a target, and the sintered body was disposed in the vacuum container. Targeting this sintered body, a tin oxide film was formed on the surface of the stainless steel substrate by sputtering. Specifically, first, the stainless steel substrate was disposed at a position facing the target, and the vacuum container was vacuated to put the vacuum container under a vacuum atmosphere (under a depressurized atmosphere). Next, argon gas was introduced into the vacuum container as sputtering gas, and in a state of heating the stainless steel substrate to 450° C., a voltage was applied to cause the argon ions to collide with the target to deposit the material of the target on the stainless steel substrate. A bias voltage was applied between the target and the stainless steel substrate. Thus, a Sb-doped tin oxide film having a thickness of 100 nm was formed on the surface of the stainless steel substrate. Content of the antimony contained in the tin oxide film measured using an X-ray spectrometer was 3.0 atomic %.

Next, the stainless steel substrate on which the tin oxide film was formed was immersed into a trisodium phosphate solution of 0.1 M at room temperature for 30 seconds and thereafter dried to obtain a test piece E1 as the separator.

Comparative Example 1

A test piece C1 was manufactured similarly to Example 1 except that the immersion process using the trisodium phosphate solution was not performed.

<Contact Resistance Test>

Figure 5:
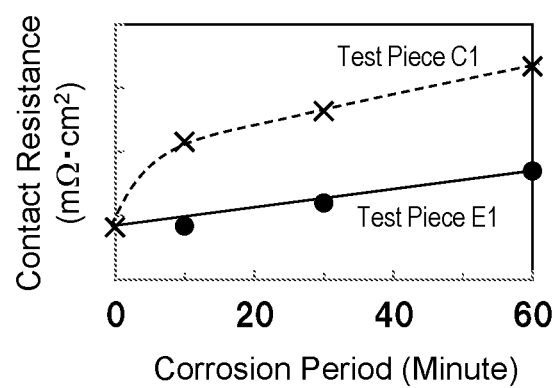
FIG. 5 is a graph illustrating results of a contact resistance test on test pieces E1 and C1 manufactured in Example 1 and Comparative Example 1.

The corrosion resistance test was conducted on the respective test pieces E1 and C1 manufactured in Example 1 and Comparative Example 1 in strongly acidic solutions containing fluorine ions, and their contact resistances were measured by the following method. Carbon papers (TGP-H120, TORAY INDUSTRIES, INC., thickness: 0.5 mm) corresponding to diffusion layers of power generation units in fuel cell devices were placed on the surfaces of the tin oxide films on the respective test pieces, gold-plated copper plates were stacked on the carbon papers, and thus the carbon papers were sandwiched between the test pieces and the copper plates. For measurement of the contact resistances alone of the tin oxide films with the carbon papers, the gold-plated copper plates were brought into contact also with the other surfaces (the surfaces on which the films were not formed) of the test pieces so as not to generate contact resistances between these members. Next, pressures at a constant load (0.98 MPa) were applied on the surfaces of the test pieces with a measuring tool. In this state, a current was flowed from a power supply while being adjusted using an ammeter such that the currents flowing through the test pieces became constant. The voltages applied across the test pieces were measured with a voltmeter, and the contact resistances of the tin oxide films with the carbon papers of the test pieces were calculated. FIG. 5 illustrates the results.

As illustrated in FIG. 5, at a corrosion period after 60 minutes, the contact resistance of the test piece E1 on which the immersion process was performed with the trisodium phosphate solution had a value about half of the contact resistance of the test piece C1 without the immersion process, and a deterioration rate of the contact resistance of the test piece E1 was reduced to about ⅓ of a deterioration rate of the contact resistance of the test piece C1.

<Corrosion Resistance Test in Strongly Acidic Solution Containing Fluorine Ions>

Figure 6:
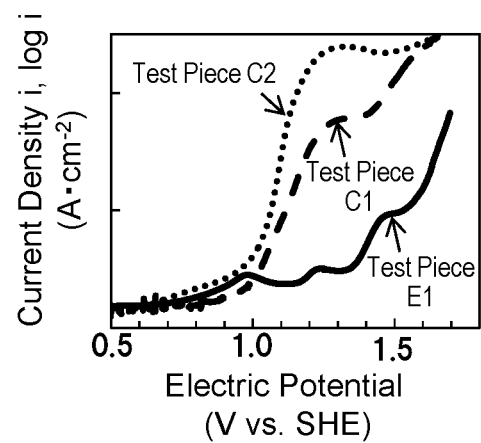
FIG. 6 is a graph illustrating results of a corrosion resistance test in strongly acidic solutions containing fluorine ions on the respective test pieces E1 and C1 manufactured in Example 1 and Comparative Example 1, and a SUS447 plate of a stainless steel substrate (test piece C2)

The corrosion resistance test in the strongly acidic solution containing the fluorine ion was conducted on the respective test pieces E1 and C1 manufactured in Example 1 and Comparative Example 1, and the SUS447 plate of the stainless steel substrate (test piece C2) by the following method, and their corrosion resistances were examined by a general anode polarization test (three-pole method). First, NaF was added to sulfuric acid (pH 2) to prepare a fluorine-ion-containing strongly acidic solution. Next, an inside of a container was filled with this strongly acidic solution, and the test pieces, a reference electrode (Ag/AgCl electrodes), and a counter electrode (Pt electrode) electrically coupled to one another were disposed. Next, an electric potential in this solution was increased from a natural immersion electric potential to a positive side at a constant sweep rate (20 to 40 mV/minute), and the anode polarization test was conducted. The sulfuric acid solution was maintained at 80° C. during this test, and the air was continued to be introduced from a bubble tube disposed in the container into the solution. FIG. 6 illustrates a relationship between the electric potential and a current density measured in this anode polarization test. The horizontal axis indicates the electric potential relative to the reference electrode, and the vertical axis indicates the current density.

As illustrated in FIG. 6, the test piece E1 on which the immersion process was performed with the trisodium phosphate solution exhibited the highest corrosion resistance.

Reference Example

To examine whether a substance other than the trisodium phosphate had a corrosion reduction effect or not, various test substances were added to etchant (the fluorine-ion-containing strongly acidic solution), and the corrosion resistance test was conducted on the SUS447 plate. As the added test substances, trisodium phosphate, sodium metasilicate ($Na_2O_3Si$), sodium tungstate ($Na_2WO_4$), or sodium molybdate ($Na_2MO_4$) were used. The concentration of each of the added substances was 1 mM. Specifically, the test was conducted by the following method.

<Corrosion Resistance Test in Etchant Containing Test substance>

Figure 7:
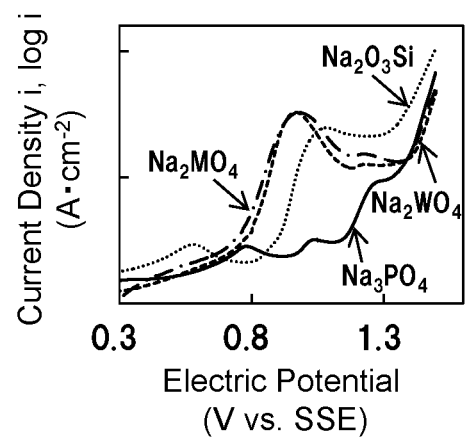
FIG. 7 is a graph illustrating results of the corrosion resistance test on the SUS447 plate of the stainless steel substrate in etchant containing various test substances.

The corrosion resistance test in the strongly acidic solution containing the test substance and the fluorine ion was conducted on the SUS447 plate of the stainless steel substrate by the following method. First, NaF and the test substance (the trisodium phosphate, the sodium metasilicate, the sodium tungstate, or the sodium molybdate) of 1 mM were added to sulfuric acid (pH 2) to prepare a fluorine-ion-containing strongly acidic solution. Next, an inside of a container was filled with this strongly acidic solution, the stainless steel substrate, reference electrodes (Ag/AgCl electrodes), and counter electrodes (Pt electrodes) electrically coupled to one another were disposed. Next, an electric potential in this solution was increased from a natural immersion electric potential to a positive side at a constant sweep rate (20 to 40 mV/minute), and the anode polarization test was conducted. The sulfuric acid solution was maintained at 80° C. during this test, and the air was continued to be introduced from a bubble tube disposed in the container into the solution. FIG. 7 illustrates a relationship between the electric potential and a current density measured in this anode polarization test. The horizontal axis indicates the electric potential relative to the reference electrode and the vertical axis indicates the current density.

When another test substance also provides the corrosion reduction effect of the stainless steel substrate similarly to the trisodium phosphate in the test system, it is presumed that a corrosion current decreases to the extent identical to that of the trisodium phosphate. However, as illustrated in FIG. 7, compared with the trisodium phosphate, the corrosion currents of the other test substances (the sodium metasilicate, the sodium tungstate, and the sodium molybdate) were large.

While the embodiment has been described in detail, the specific configuration is not limited to the embodiment. Design changes within a scope not departing from the gist of the present disclosure are included in the present disclosure.

DESCRIPTION OF SYMBOLS

1 Cell
2 MEGA (power generation unit)
3 Separator (fuel cell separator)
4 Membrane Electrode Assembly (MEA)
6 Electrode
7 Gas diffusion layer
10 Fuel cell stack (fuel cell device)
21 Gas flow channel
22 Gas flow channel
31 Stainless steel substrate
32 Tin oxide film
33 Defective portion
34 Film (protective film)

What is claimed is:

1. A method for manufacturing a fuel cell separator including a stainless steel substrate, comprising:
    forming a tin oxide film on a surface of the stainless steel substrate, the tin oxide film comprising a defective portion;
    exposing the stainless steel substrate having the at least the defective portion of the tin oxide film to phosphoric acid or phosphate by immersion in a solution or spraying with the solution, the solution containing the phosphoric acid or the phosphate; and
    attaching phosphoric acid or phosphate to at least the defective portion in the tin oxide film, forming the fuel cell separator.

2. The method for manufacturing a fuel cell separator according to claim 1, wherein the phosphate is inorganic phosphate.

3. The method for manufacturing a fuel cell separator according to claim 2, wherein the inorganic phosphate is orthophosphate.

4. The method for manufacturing a fuel cell separator according to claim 1, wherein the attaching includes:
    brining the stainless steel substrate on which the tin oxide film is formed into contact with a solution containing the phosphoric acid or the phosphate; and
    drying the stainless steel substrate after the contact.

5. The method for manufacturing a fuel cell separator according to claim 1, further comprising
    removing a passive film present on the surface of the stainless steel substrate under a vacuum condition prior to the forming, the forming including forming the tin oxide film with the vacuum condition maintained.

6. A fuel cell separator comprising:
    a stainless steel substrate and;
    a tin oxide film formed on a surface of the stainless steel substrate, wherein phosphoric acid or phosphate attaches to a defective portion in the tin oxide film by immersion of the defective portion in or spraying the defective portion with a solution containing phosphoric acid or phosphate.

7. A fuel cell device comprising
    the fuel cell separator according to claim 6.

8. The fuel cell device according to claim 7, further comprising
    a solid electrolyte membrane.

9. The fuel cell device according to claim 8,
    wherein the solid electrolyte membrane contains a fluorine-based electrolyte resin.

* * * * *